(12) United States Patent
Uetsuki et al.

(10) Patent No.: US 11,168,586 B2
(45) Date of Patent: Nov. 9, 2021

(54) STRESS REDUCTION STRUCTURE, GAS TURBINE CASING, AND GAS TURBINE

(71) Applicant: MITSUBISHI HEAVY INDUSTRIES AERO ENGINES, LTD., Aichi (JP)

(72) Inventors: Yasuyuki Uetsuki, Tokyo (JP); Tadayuki Hanada, Aichi (JP); Yohei Fujimoto, Aichi (JP); Takafumi Ota, Aichi (JP); Yusuke Ichihashi, Aichi (JP)

(73) Assignee: MITSUBISHI HEAVY INDUSTRIES AERO ENGINES, LTD., Aichi (JP)

( * ) Notice: Subject to any disclaimer, the term of this patent is extended or adjusted under 35 U.S.C. 154(b) by 23 days.

(21) Appl. No.: 16/623,434

(22) PCT Filed: Apr. 9, 2018

(86) PCT No.: PCT/JP2018/014929
§ 371 (c)(1),
(2) Date: Dec. 17, 2019

(87) PCT Pub. No.: WO2018/235394
PCT Pub. Date: Dec. 27, 2018

(65) Prior Publication Data
US 2020/0109647 A1 Apr. 9, 2020

(30) Foreign Application Priority Data
Jun. 21, 2017 (JP) .............................. JP2017-121293

(51) Int. Cl.
*F01D 25/24* (2006.01)
*F23R 3/00* (2006.01)

(52) U.S. Cl.
CPC .............. *F01D 25/24* (2013.01); *F23R 3/002* (2013.01); *F05D 2220/32* (2013.01);
(Continued)

(58) Field of Classification Search
CPC ............ F23R 3/002; F23R 2900/00005; F23R 2900/00018; F01D 25/14; F01D 25/24;
(Continued)

(56) References Cited

U.S. PATENT DOCUMENTS 3,661,045 A  5/1972  Mermelstein
5,485,723 A * 1/1996  McCoy ................. F01D 21/045
                                                60/226.1
(Continued)

FOREIGN PATENT DOCUMENTS

JP   H03045449 U   4/1991
JP   H05240110 A   9/1993
(Continued)

OTHER PUBLICATIONS

Office Action for Japanese Application No. 2017-121293 dated Oct. 13, 2020; 7pp.
(Continued)

*Primary Examiner* — Igor Kershteyn
(74) *Attorney, Agent, or Firm* — Hauptman Ham, LLP

(57) ABSTRACT

The present invention enables machining to be easily performed and reduces stress concentration on a machined hole that is formed in a cylindrical member. Recesses (2) recessed in the depth direction of a machined hole (1) are formed on circumferential side-portions of the machined hole 1 formed in a cylindrical member (10). In each of the recesses (2), a part of the opening edge is formed to be a circular arc portion (2*a*) that has a circular arc shape, the bottom is formed to be gradually shallowed by an inclined surface (2*c*) toward an opened portion (2*b*) in which the circular arc shape is opened, from a part along the circular arc portion (2*a*), and the circular arc portion (2*a*) is disposed toward the machined hole (1).

20 Claims, 5 Drawing Sheets

(52) U.S. Cl.
CPC ...... *F05D 2230/10* (2013.01); *F05D 2230/53* (2013.01); *F05D 2260/941* (2013.01); *F23R 2900/00005* (2013.01)

(58) Field of Classification Search
CPC .... F02C 7/00; F05D 2220/32; F05D 2230/10; F05D 2230/53; F05D 2250/292; F05D 2250/193; F05D 2250/73; F05D 2260/941
See application file for complete search history.

(56) References Cited

U.S. PATENT DOCUMENTS

| | | | |
|---|---|---|---|
| 5,819,808 A | 10/1998 | Smith | |
| 6,237,344 B1* | 5/2001 | Lee | F01D 25/12 60/754 |
| 2002/0015642 A1 | 2/2002 | London | |
| 2003/0131603 A1* | 7/2003 | Bolender | F23R 3/06 60/772 |
| 2011/0064580 A1 | 3/2011 | Barnes et al. | |
| 2012/0237333 A1 | 9/2012 | Pope et al. | |
| 2015/0076756 A1 | 3/2015 | Imaizumi et al. | |
| 2016/0201511 A1 | 7/2016 | Chang, Jr. et al. | |
| 2016/0273771 A1 | 9/2016 | Cunha et al. | |

FOREIGN PATENT DOCUMENTS

| | | |
|---|---|---|
| JP | 2003075489 A | 3/2003 |
| WO | 2008035497 A1 | 3/2008 |
| WO | 2013141401 A1 | 9/2013 |
| WO | 2015038931 A1 | 3/2015 |
| WO | 2015130381 A2 | 9/2015 |

OTHER PUBLICATIONS

Extended European Search Report for European Application No. 18819966.5 dated Nov. 20, 2020; 12pp.
International Search Report and Written Opinion of International Application No. PCT/JP2018/014929 dated Jul. 3, 2018; 16 pp.

* cited by examiner

|  | d1 | w | w1 | w2 | h |
|---|---|---|---|---|---|
| BASE | 0.0548 | 0.4270 | 0.1606 | 0.2675 | 0.1247 |
| TEST 1 | 0.0549 | 0.2624(=D) | 0.1300 | 0.1321 | 0.1954 |
| TEST 2 | 0.0548 | 0.4994(=2D) | 0.2483 | 0.2507 | 0.1097 |
| TEST 3 | 0.0549 | 0.7532(=3D) | 0.3736 | 0.3789 | 0.0561 |
| TEST 4 | 0.0844(=D/3) | 0.4278 | 0.2168 | 0.2106 | 0.1248 |
| TEST 5 | 0.1250(=D/2) | 0.4278 | 0.2168 | 0.2106 | 0.1248 |
| TEST 6 | 0.2509(=D) | 0.4278 | 0.2168 | 0.2106 | 0.1248 |

STRESS REDUCTION STRUCTURE, GAS TURBINE CASING, AND GAS TURBINE

RELATED APPLICATIONS

The present application is a National Phase of International Application Number PCT/JP2018/014929 filed Apr. 9, 2018 and claims priority to Japanese Application Number 2017-121293 filed Jun. 21, 2017.

TECHNICAL FIELD

The present invention relates to a stress reduction structure, a gas turbine casing provided with a stress reduction structure, and a gas turbine.

BACKGROUND ART

For example, PTL 1 discloses providing a recess in the depth direction of a circular hole near a point A where a compressive load concentrates on an inlet surface provided with the circular hole and dispersing the compressive load to a side portion of the point A in order to eliminate the stress concentration that occurs at the mouth of the circular hole in a pin boss of a piston.

For example, PTL 2 discloses providing packets (recesses) on both hoop-direction sides of a hole in order to reduce the hoop stress that occurs in the hole provided in a case of a gas turbine engine and the pocket having an outer edge having a circular shape including a racetrack shape and including a flat bottom portion, a curved bottom portion, or a spherical shape.

CITATION LIST

Patent Literature

[PTL 1] Japanese Unexamined Patent Application Publication No. 5-240110
[PTL 2] Pamphlet of International Publication No. WO2015/038931

SUMMARY OF INVENTION

Technical Problem

A casing of a rotating structure such as a gas turbine is formed in a cylindrical shape and a high thermal stress results from the temperature difference that occurs at start and stop. In addition, the pressure inside the casing rises with operation and hoop stress, which is a circumferential tensile stress, occurs on the cylindrical shape. In such casings, machined holes for attaching external components or the like are formed. The high thermal stress and the hoop stress described above are repeatedly applied at start and stop, and thus the low-cycle fatigue life of the machined hole is significantly reduced. An increase in thickness in the vicinity of the machined hole is a general measure for hoop stress reduction around the machined hole. As for aviation gas turbines, however, the measure is not preferable from the viewpoint of suppressing an increase in weight as much as possible.

PTL 2 discloses a device for reducing the hoop stress that occurs in the hole provided in the case of the gas turbine engine as described above. However, the flat bottom portion, the curved bottom portion, or the spherical pocket as illustrated in PTL 2 has poor machinability- and high cost-related problems.

The present invention is to solve the above problems, and an object of the present invention is to provide a stress reduction structure, a gas turbine casing, and a gas turbine with which machining can be facilitated and stress concentration on a machined hole formed in a cylindrical member can be reduced.

Solution to Problem

In order to achieve the above object, in a stress reduction structure according to an aspect of the present invention, a recess recessed in a depth direction of a machined hole is formed on a circumferential side-portion of the machined hole formed in a cylindrical member, and in the recess, a part of an opening edge is formed in a circular arc shape, a bottom portion is formed so as to be gradually decreased in depth by an inclined surface from a part along the circular arc shape toward an open side of the circular arc shape, and the circular arc-shaped part is disposed toward the machined hole.

In the stress reduction structure, the recesses recessed in the depth direction of the machined hole are formed on the circumferential side-portions of the machined hole formed in the cylindrical member. Accordingly, the tensile load that occurs in the circumferential direction of the machined hole is mitigated by the recess, the position where the tensile load is applied is displaced in the depth direction from the opening portion of the machined hole, the load is prevented in the opening portion, and thus it is possible to reduce stress concentration at both axial ends of the opening portion of the machined hole. The recess acting in this manner has a part of the opening edge formed in a circular arc shape and the bottom portion is formed so as to be gradually decreased in depth by the inclined surface from the part along the circular arc shape toward the open side of the circular arc shape. Accordingly, the recess can be easily formed without much machining labor by machining being performed by means of a tool such as an end mill and with a rotary shaft inclined such that a part of a leading edge is in contact with the surface of the cylindrical member. In the recess formed in such a shape, the circular arc-shaped part having a relatively deep bottom portion is disposed toward the machined hole, and thus the effect of the mitigation of the tensile load occurring in the circumferential direction of the machined hole can be obtained to a significant extent. As a result, it is possible to reduce the stress concentration on the machined hole formed in the cylindrical member while suppressing an increase in weight.

In the stress reduction structure according to an aspect of the present invention, it is preferable that the recess has a deepest depth h within a range of 50% or less of a plate thickness H of the cylindrical member in which the machined hole is formed.

By the deepest depth h of the recess being 50% or less of the plate thickness H of the cylindrical member in which the machined hole is formed in the stress reduction structure, the position where the tensile load is applied can be displaced in the depth direction from the opening portion of the machined hole, the effect of load prevention in the opening portion can be obtained to a significant extent, and tensile load application to the recess itself can be prevented.

In the stress reduction structure according to an aspect of the present invention, it is preferable that the recess has a shortest distance d1 to an opening edge of the machined hole within a range of 50% or less of a circumferential diametral dimension D of the machined hole.

By the shortest distance d1 of the recess being 50% or less of the circumferential diametral dimension D of the machined hole in the stress reduction structure, the effect of load prevention in the opening portion of the machined hole can be obtained to a significant extent.

In the stress reduction structure according to an aspect of the present invention, it is preferable that a circumferential diametral dimension d2 of the recess is within a range of 100% or more to 300% or less of a circumferential diametral dimension D of the machined hole.

The effect of load prevention in the opening portion of the machined hole can be obtained to a significant extent by the circumferential diametral dimension d2 of the recess being 100% or more of the circumferential diametral dimension D of the machined hole in the stress reduction structure. The effect of load prevention in the opening portion of the machined hole can be obtained to a significant extent and a decline in the strength of the cylindrical member caused by the recess being provided can be suppressed by the circumferential diametral dimension d2 of the recess being 300% or less of the circumferential diametral dimension D of the machined hole.

In the stress reduction structure according to an aspect of the present invention, it is preferable that an axial diametral dimension w of the recess is within a range of 100% or more to 300% or less of an axial diametral dimension W of the machined hole and the dimension W of the machined hole is included in a circumferential position in the range of the dimension w.

The effect of load prevention in the opening portion of the machined hole can be obtained to a significant extent by the axial diametral dimension w of the recess being 100% or more of the axial diametral dimension W of the machined hole and the dimension W of the machined hole being included in the circumferential position in the range of the dimension w in the stress reduction structure. The effect of load prevention in the opening portion of the machined hole can be obtained to a significant extent and a decline in the strength of the cylindrical member caused by the recess being provided can be suppressed by the axial diametral dimension w of the recess being 300% or less of the axial diametral dimension W of the machined hole and the dimension W of the machined hole being included in the circumferential position in the range of the dimension w.

In the stress reduction structure according to an aspect of the present invention, it is preferable that the recesses are disposed on both circumferential side-portions of the machined hole.

In the stress reduction structure, the action of the mitigation of the tensile load occurring on both circumferential sides of the machined hole can be obtained to a significant extent by the recesses being disposed on both circumferential side-portions of the machined hole.

In the stress reduction structure according to an aspect of the present invention, it is preferable that the recesses are disposed on both circumferential side-portions of the machined hole and formed in a symmetrical shape with respect to a center of the machined hole.

In the stress reduction structure, the action of the mitigation of the tensile load occurring on both circumferential sides of the machined hole can be obtained to a significant extent and equally on both circumferential sides by the recesses being disposed on both circumferential side-portions of the machined hole and formed in a symmetrical shape with respect to the center of the machined hole.

In the stress reduction structure according to an aspect of the present invention, it is preferable that the machined hole is formed in an elliptical shape that is long in a circumferential direction.

In the stress reduction structure, the curvature at both axial ends where stress concentrates is larger than in the case of a circular shape by the machined hole being formed in an elliptical shape that is long in a circumferential direction, and thus the stress is easily dispersed in the circumferential direction of both ends. As a result, it is possible to reduce the stress concentration at both axial ends of the opening portion of the machined hole in synergy with the effect of the recess.

In order to achieve the above object, a gas turbine casing according to an aspect of the present invention forms a cylindrical member having the machined hole and the recess described above.

With the gas turbine casing, it is possible to prevent a decline in low-cycle fatigue life based on the machined hole in the case of high thermal stress or hoop stress occurrence.

In order to achieve the above object, a gas turbine according to an aspect of the present invention includes the gas turbine casing described above as an outer shell.

With the gas turbine, a decline in low-cycle fatigue life is prevented in the gas turbine casing, and thus life extension and reliability improvement can be achieved.

Advantageous Effects of Invention

With the present invention, it is possible to facilitate machining and reduces stress concentration on a machined hole formed in a cylindrical member.

DESCRIPTION OF EMBODIMENTS

Hereinafter, an embodiment according to the present invention will be described in detail based on the drawings. The present invention is not limited by the embodiment. In addition, constituent elements in the following embodiment include those that can be easily replaced by those skilled in the art or those that are substantially the same.

Figure 1:
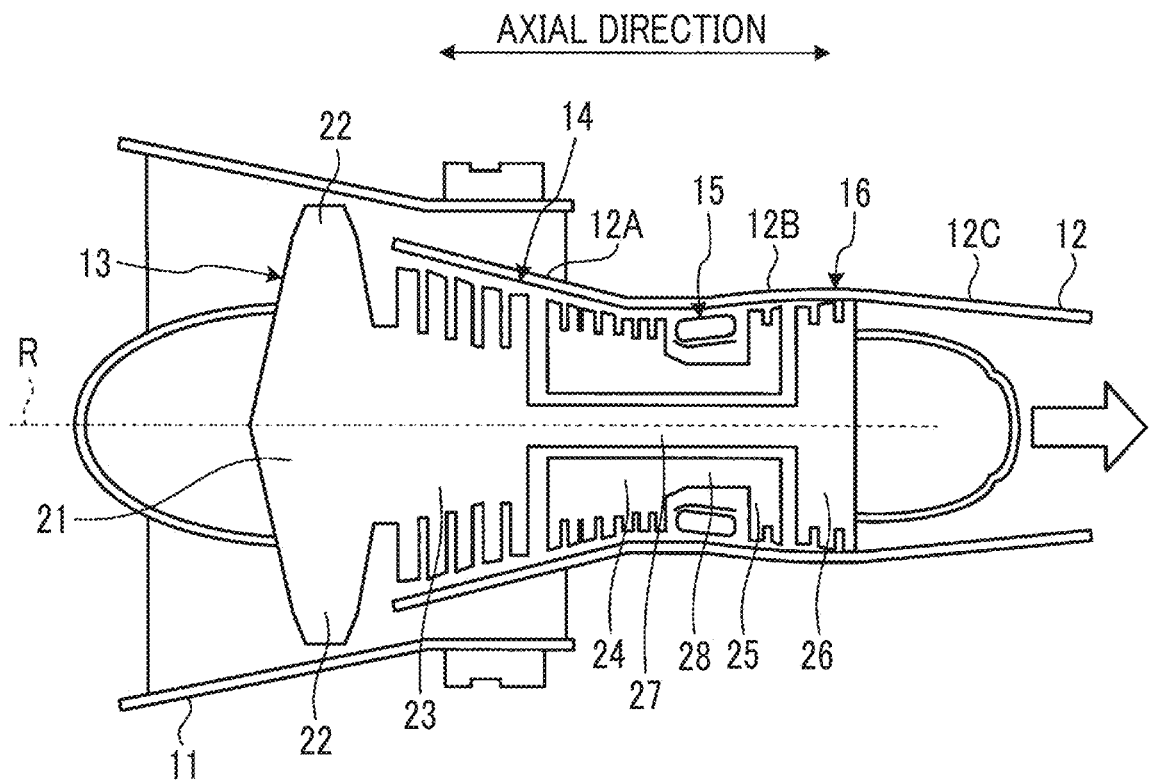
FIG. 1 is a schematic configuration diagram of a gas turbine according to an embodiment of the present invention.

FIG. 1 is a schematic configuration diagram of a gas turbine according to the present embodiment.

The gas turbine illustrated in FIG. 1 is an aviation gas turbine. The aviation gas turbine has a fan casing 11 and a gas turbine casing 12. A fan 13 is accommodated in the fan casing 11. The gas turbine casing 12 is formed in a cylindrical shape with a compressor casing 12A, a combustor casing 12B, and a turbine casing 12C continuously disposed. A compressor 14 is accommodated in the compressor casing 12A, a combustor 15 is accommodated in the combustor casing 12B, and a turbine 16 is accommodated in the turbine casing 12C.

The fan 13 is configured by a plurality of fan blades 22 being mounted on the outer peripheral portion of a rotary shaft 21. The compressor 14 has a low-pressure compressor 23 and a high-pressure compressor 24. A plurality of the combustors 15 are positioned downstream of the compressor 14 and disposed in a circumferential direction. The turbine 16 is positioned downstream of the combustor 15 and has a high-pressure turbine 25 and a low-pressure turbine 26. The rotary shaft 21 of the fan 13 and the low-pressure compressor 23 are connected, and the low-pressure compressor 23 and the low-pressure turbine 26 are connected by a first rotor shaft 27. The high-pressure compressor 24 and the high-pressure turbine 25 are connected by a cylindrical second rotor shaft 28 positioned on the outer periphery side of the first rotor shaft 27.

Accordingly, in the compressor 14, air taken in from an air intake port becomes high-temperature and high-pressure compressed air by being compressed through a plurality of stator and rotor vanes (not illustrated) in the low-pressure compressor 23 and the high-pressure compressor 24. In the combustor 15, combustion is performed by a predetermined fuel being supplied to the compressed air. The high-temperature and high-pressure combustion gas that is a working fluid generated in the combustor 15 passes through a plurality of stator and rotor vanes (not illustrated) in the high-pressure turbine 25 and the low-pressure turbine 26 constituting the turbine 16, and the first rotor shaft 27 and the second rotor shaft 28 are driven to rotate as a result. In this case, driving is performed by the rotational force of the low-pressure turbine 26 being transmitted to the low-pressure compressor 23 by the first rotor shaft 27. In addition, driving is performed by the rotational force of the high-pressure turbine 25 being transmitted to the high-pressure compressor 24 by the second rotor shaft 28. As a result, the fan 13 can be driven and thrust can be obtained by means of the exhaust gas discharged from the turbine 16.

The gas turbine according to the present embodiment is not limited to the aviation gas turbine described above and includes, for example, a power generation gas turbine.

The stress reduction structure according to the present embodiment is applied to the gas turbine casing 12 in the gas turbine as described above. The gas turbine casing 12 is formed in a cylindrical shape as described above, and a high thermal stress results from the temperature difference that occurs when the gas turbine is started or stopped. In addition, the pressure inside the gas turbine casing 12 rises with operation and hoop stress, which is a circumferential tensile stress, occurs on the cylindrical shape. The high thermal stress and the hoop stress occur particularly in the combustor casing 12B generating a combustion gas. Here, the circumferential direction refers to a circumferential direction around an axial center R, which is the center of rotation of the first rotor shaft 27 and the second rotor shaft 28 in FIG. 1. The axial direction in the following description refers to a direction parallel to the axial center R.

Figure 2:
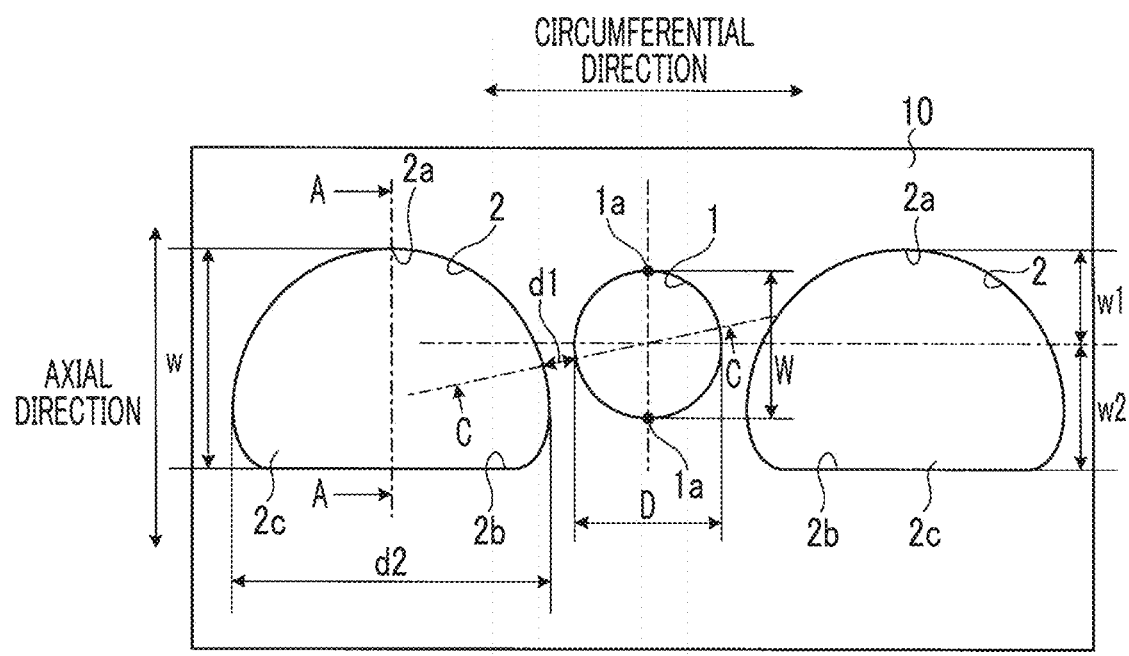
FIG. 2 is a plan view of a stress reduction structure according to the embodiment of the present invention.
Figure 3:
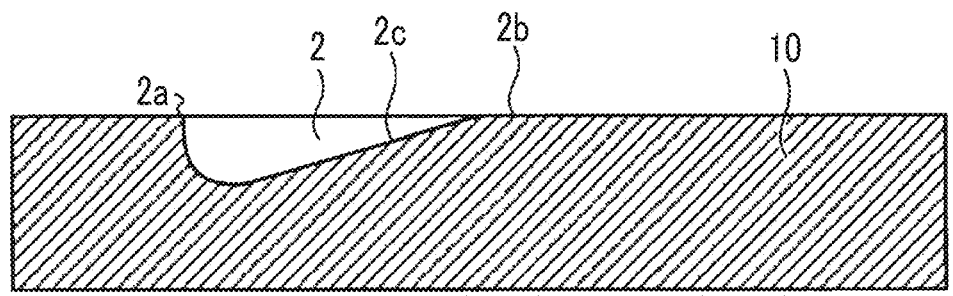
FIG. 3 is a cross-sectional view taken along line A-A in FIG. 2.
Figure 4:
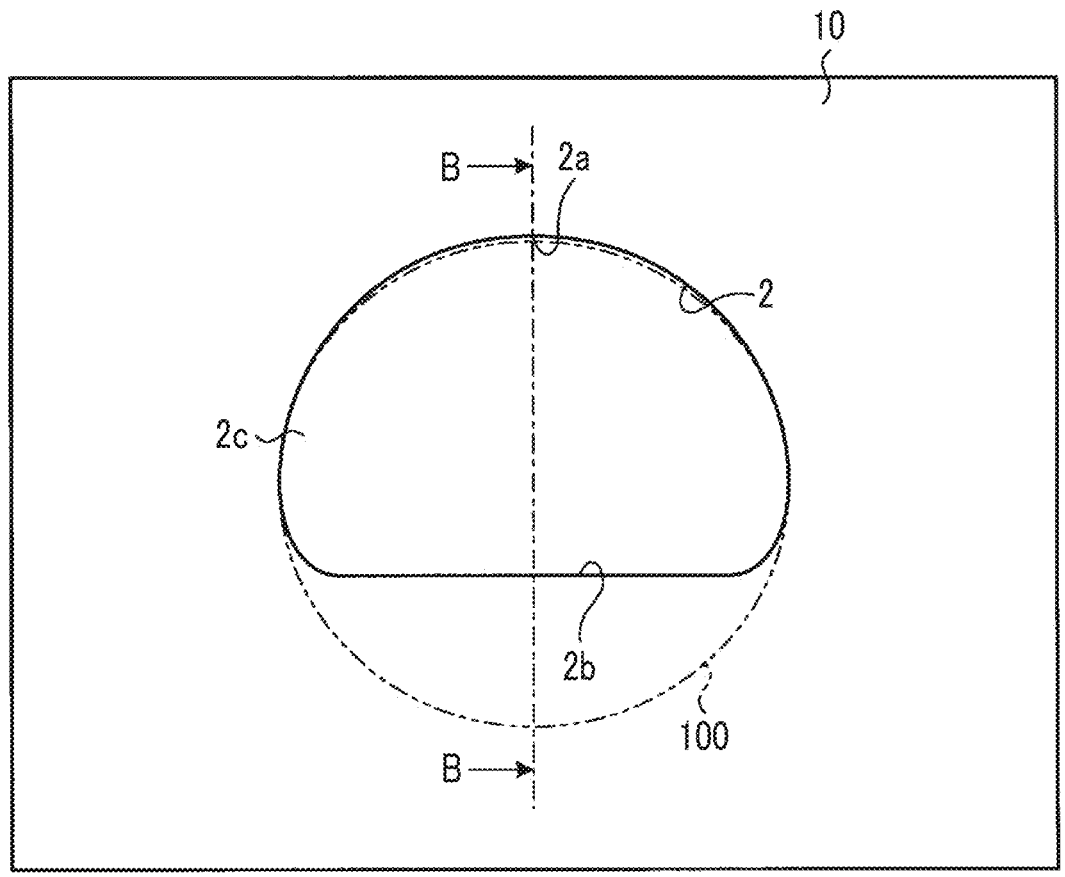
FIG. 4 is a plan view illustrating a method for manufacturing the stress reduction structure according to the embodiment of the present invention.
Figure 5:
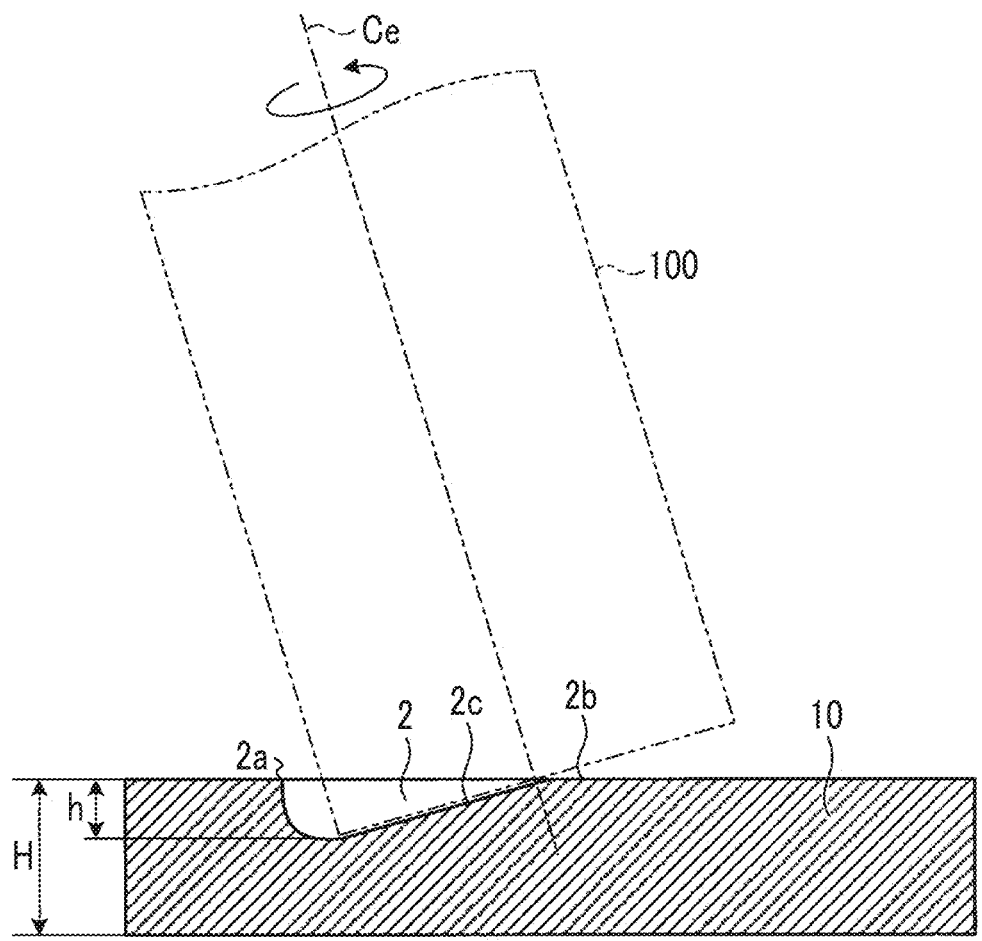
FIG. 5 is a cross-sectional view taken along line B-B in FIG. 4.
Figure 6:
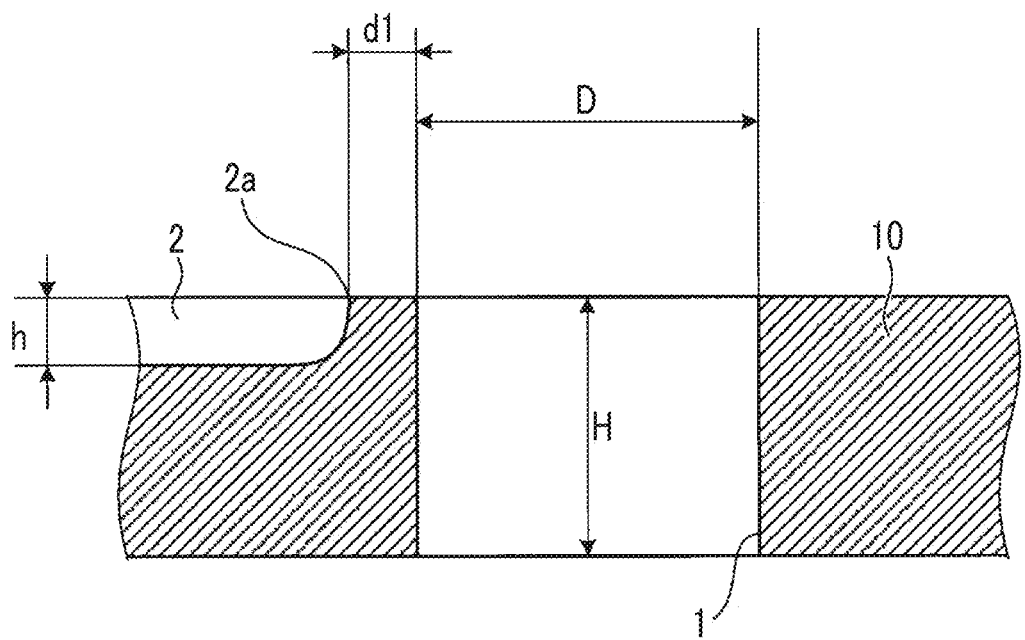
FIG. 6 is a cross-sectional view taken along line C-C in FIG. 2.

FIG. 2 is a plan view of the stress reduction structure according to the present embodiment. FIG. 3 is a cross-sectional view taken along line A-A in FIG. 2. FIG. 4 is a plan view illustrating a method for manufacturing the stress reduction structure according to the present embodiment. FIG. 5 is a cross-sectional view taken along line B-B in FIG. 4. FIG. 6 is a cross-sectional view taken along line C-C in FIG. 2.

FIGS. 2 to 6 illustrate a part of the gas turbine casing 12 (the combustor casing 12B in particular) as a part of a cylindrical member 10 having a cylindrical shape. The cylindrical member 10 has a machined hole 1 for attaching an external component or the like.

In the machined hole 1, the high thermal stress and the hoop stress described above are repeatedly applied at start and stop, and thus a tensile load in the circumferential direction in FIG. 2 causes stress concentration at both axial ends 1a of an opening portion, which results in a significant reduction in the low-cycle fatigue life of the cylindrical member 10. Accordingly, the stress reduction structure of the present embodiment is to prevent a circumferential tensile load with respect to the machined hole 1 formed in the cylindrical member 10 and reduce the stress concentration.

In the stress reduction structure of the present embodiment, recesses 2 recessed in the depth direction of the machined hole 1 are formed on the circumferential side-portions of the machined hole 1. As illustrated in FIG. 2, the recess 2 is formed by a circular arc portion 2a where a part of an opening edge is formed in a circular arc shape (horseshoe or C shape) and an open portion 2b where the circular arc shape is open and both ends of the circular arc shape are linearly connected. In addition, as illustrated in FIG. 3, the bottom portion of the recess 2 is formed so as to be gradually decreased in depth by an inclined surface 2c from the part along the circular arc portion 2a toward the open portion 2b side. In other words, the bottom portion of the recess 2 is formed such that the part along the circular arc portion 2a is deep and particularly the central portion of the circular arc portion 2a is the deepest and the bottom portion of the recess 2 is formed so as to be gradually decreased in depth toward the open portion 2b by the inclined surface 2c. In the recess 2, the circular arc-shaped circular arc portion 2a is disposed toward the machined hole 1.

As illustrated in FIGS. 4 and 5, the recess 2 is formed by a columnar end mill 100 used for cutting being used and machining being performed with a rotary shaft Ce inclined such that a part of the leading edge of the end mill 100 is in contact with the surface of the cylindrical member 10. Accordingly, the circular arc portion 2a, the open portion 2b, and the inclined surface 2c of the recess 2 are formed by a part of the leading edge being in contact at an angle with the surface of the cylindrical member 10. As illustrated in FIGS. 3 and 5, the inner surface of the recess 2 that is along the circular arc portion 2a is curved and smoothly formed and the inner surface is smoothly formed by the shape of the cutting blade (not illustrated) of the end mill 100. As described above, the recess 2 can be easily formed by the single end mill 100 without machining labor such as using a large number of tools and moving a tool.

In the stress reduction structure of the present embodiment, the recesses 2 recessed in the depth direction of the machined hole 1 are formed on the circumferential side-portions of the machined hole 1 formed in the cylindrical member 10. Accordingly, the tensile load that occurs in the circumferential direction of the machined hole is mitigated by the recess 2, the position where the tensile load is applied is displaced in the depth direction from the opening portion of the machined hole 1, the load is prevented in the opening portion, and thus it is possible to reduce stress concentration at both axial ends 1a of the opening portion of the machined hole 1. The recess 2 acting in this manner has the circular arc portion 2a where a part of the opening edge is formed in a circular arc shape and the bottom portion is formed so as to be gradually decreased in depth by the inclined surface 2c from the part along the circular arc portion 2a toward the open portion 2b where the circular arc shape is open. As described above, the recess 2 can be easily formed without much machining labor by machining being performed by means of the end mill 100 and with the rotary shaft Ce inclined such that a part of the leading edge is in contact with the surface of the cylindrical member 10. In the recess 2 formed in such a shape, the circular arc portion 2a having a relatively deep bottom portion is disposed toward the machined hole 1, and thus the effect of the mitigation of the tensile load occurring in the circumferential direction of the machined hole 1 can be obtained to a significant extent. As a result, it is possible to reduce the stress concentration on the machined hole 1 formed in the cylindrical member 10 while suppressing an increase in weight.

The recess 2 is capable of obtaining the effect of the mitigation of the tensile load occurring in the circumferential direction of the machined hole 1 to a significant extent insofar as the circular arc portion 2a having a relatively deep bottom portion is disposed toward the machined hole 1. Accordingly, the open portion 2b may have the disposition illustrated in FIG. 2, in which the open portion 2b is not disposed toward the axial direction. For example, a configuration may be adopted in which the open portion 2b is disposed toward the direction opposite to the machined hole 1 in the circumferential direction.

The inner surface of the recess 2 that is along the circular arc portion 2a is curved, smoothly formed, and continuous with the inclined surface 2c. Accordingly, it is possible to prevent tensile load application to the recess 2 itself as compared with a shape in which the inner surface has a corner.

The recess 2 is provided on the circumferential side-portion of the machined hole 1 open on the tube inner side or the tube outer side of the cylindrical member 10 in the case of penetration by the machined hole 1. In the case of non-penetration by the machined hole 1, the recess 2 is provided on the circumferential side-portion of the machined hole 1 on the side where the machined hole 1 is open.

As illustrated in FIGS. 5 and 6, in the stress reduction structure of the present embodiment, it is preferable that a deepest depth h of the recess 2 is within the range of 50% or less of a plate thickness H of the cylindrical member 10 in which the machined hole 1 is formed.

By the deepest depth h of the recess 2 being 50% or less of the plate thickness H of the cylindrical member 10 in which the machined hole 1 is formed, the position where the tensile load is applied can be displaced in the depth direction from the opening portion of the machined hole 1, the effect of load prevention in the opening portion can be obtained to a significant extent, and tensile load application to the recess 2 itself can be prevented.

As illustrated in FIGS. 2 and 6, in the stress reduction structure of the present embodiment, it is preferable that a shortest distance d1 between the recess 2 and the opening edge of the machined hole 1 is within the range of 50% or less of a diametral dimension D of the machined hole 1 in the circumferential direction.

By the shortest distance d1 of the recess 2 being 50% or less of the diametral dimension D of the machined hole 1 in the circumferential direction, the effect of load prevention in the opening portion of the machined hole 1 can be obtained to a significant extent.

As illustrated in FIG. 2, in the stress reduction structure of the present embodiment, it is preferable that a diametral dimension d2 of the recess 2 in the circumferential direction is within the range of 100% or more to 300% or less of the diametral dimension D of the machined hole 1 in the circumferential direction.

The effect of load prevention in the opening portion of the machined hole 1 can be obtained to a significant extent by the diametral dimension d2 of the recess 2 in the circumferential direction being 100% or more of the diametral dimension D of the machined hole 1 in the circumferential direction. The effect of load prevention in the opening portion of the machined hole 1 can be obtained to a significant extent and a decline in the strength of the cylindrical member 10 caused by the recess 2 being provided can be suppressed by the diametral dimension d2 of the recess 2 in the circumferential direction being 300% or less of the diametral dimension D of the machined hole 1 in the circumferential direction.

As illustrated in FIG. 2, in the stress reduction structure of the present embodiment, it is preferable that a diametral dimension w of the recess 2 in the axial direction is within the range of 100% or more to 300% or less of a diametral dimension W of the machined hole 1 in the axial direction and the dimension W of the machined hole 1 is included in the circumferential position in the range of the dimension w.

The effect of load prevention in the opening portion of the machined hole 1 can be obtained to a significant extent by the diametral dimension w of the recess 2 in the axial direction being 100% or more of the diametral dimension W of the machined hole 1 in the axial direction and the dimension W of the machined hole 1 being included in the circumferential position in the range of the dimension w. The effect of load prevention in the opening portion of the machined hole 1 can be obtained to a significant extent and a decline in the strength of the cylindrical member 10 caused by the recess 2 being provided can be suppressed by the diametral dimension w of the recess 2 in the axial direction being 300% or less of the diametral dimension W of the machined hole 1 in the axial direction and the dimension W of the machined hole 1 being included in the circumferential position in the range of the dimension w.

As illustrated in FIG. 2, in the stress reduction structure of the present embodiment, it is preferable that the recesses 2 are disposed on both circumferential side-portions of the machined hole 1.

Although the above-described effects can be obtained even with the recess 2 disposed on one circumferential side-portion of the machined hole 1, the action of the mitigation of the tensile load occurring on both circumferential sides of the machined hole 1 can be obtained to a significant extent by the recesses 2 being disposed on both circumferential side-portions of the machined hole 1.

As illustrated in FIG. 2, in the stress reduction structure of the present embodiment, it is preferable that the recesses 2 are disposed on both circumferential side-portions of the machined hole 1 and formed in a symmetrical shape with respect to the center of the machined hole 1.

Although the above-described effects can be obtained even with the recess 2 disposed on one circumferential side-portion of the machined hole 1 and formed asymmetrically with respect to the center of the machined hole 1, the action of the mitigation of the tensile load occurring on both circumferential sides of the machined hole 1 can be obtained to a significant extent and equally on both sides in the circumferential direction by the recesses 2 being disposed on both circumferential side-portions of the machined hole 1 and formed in a symmetrical shape with respect to the center of the machined hole 1.

Figures 7, 8:
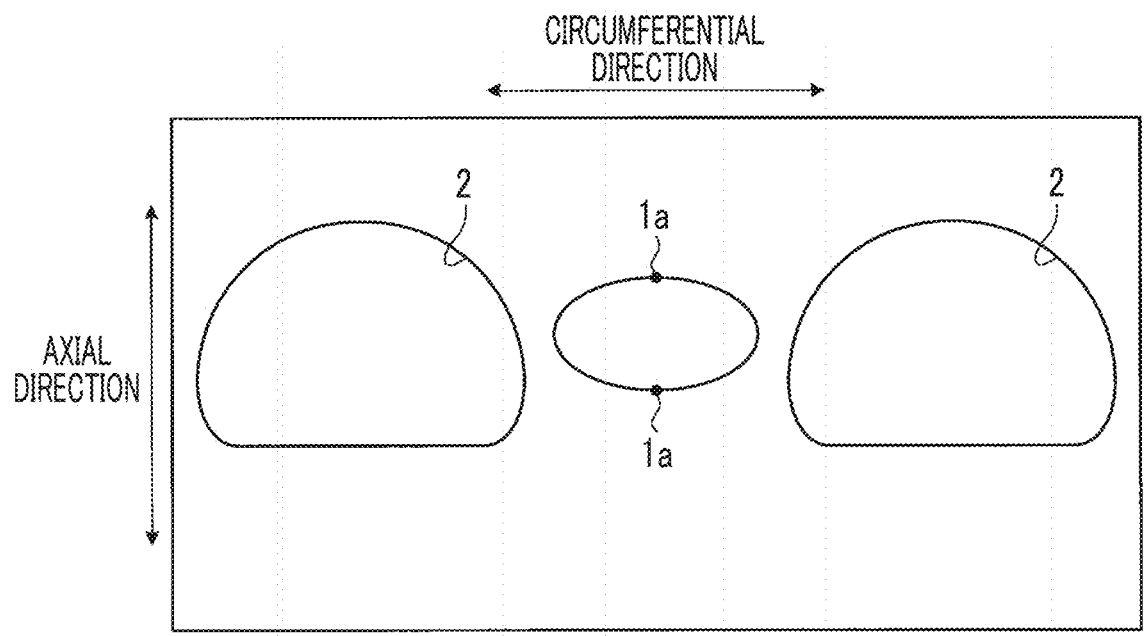
FIG. 7 is a plan view illustrating another example of the stress reduction structure according to the embodiment of the present invention.
FIG. 8 is a chart according to an example of the present invention.

FIG. 7 is a plan view illustrating another example of the stress reduction structure according to the embodiment of the present invention.

As illustrated in FIG. 7, in the stress reduction structure of the present embodiment, it is preferable that the machined hole 1 is formed in an elliptical shape that is long in a circumferential direction.

Although the above-described effects can be obtained even with the machined hole 1 formed in a perfect circle shape as illustrated in FIG. 2, the curvature at both axial ends 1a where stress concentrates is larger than in the case of a circular shape by the machined hole 1 being formed in an elliptical shape that is long in a circumferential direction, and thus the stress is easily dispersed in the circumferential direction of both ends 1a. As a result, it is possible to reduce the stress concentration at both axial ends 1a of the opening portion of the machined hole 1 in synergy with the effect of the recess 2.

It is preferable that the gas turbine casing 12 of the present embodiment forms the cylindrical member 10 having the machined hole 1 and the recess 2 described above.

With the gas turbine casing 12, it is possible to prevent a decline in low-cycle fatigue life based on the machined hole 1 in the case of high thermal stress or hoop stress occurrence.

It is preferable that the gas turbine of the present embodiment has the gas turbine casing 12 as an outer shell.

With the gas turbine, a decline in low-cycle fatigue life is prevented in the gas turbine casing 12, and thus life extension and reliability improvement can be achieved.

Figure 9:
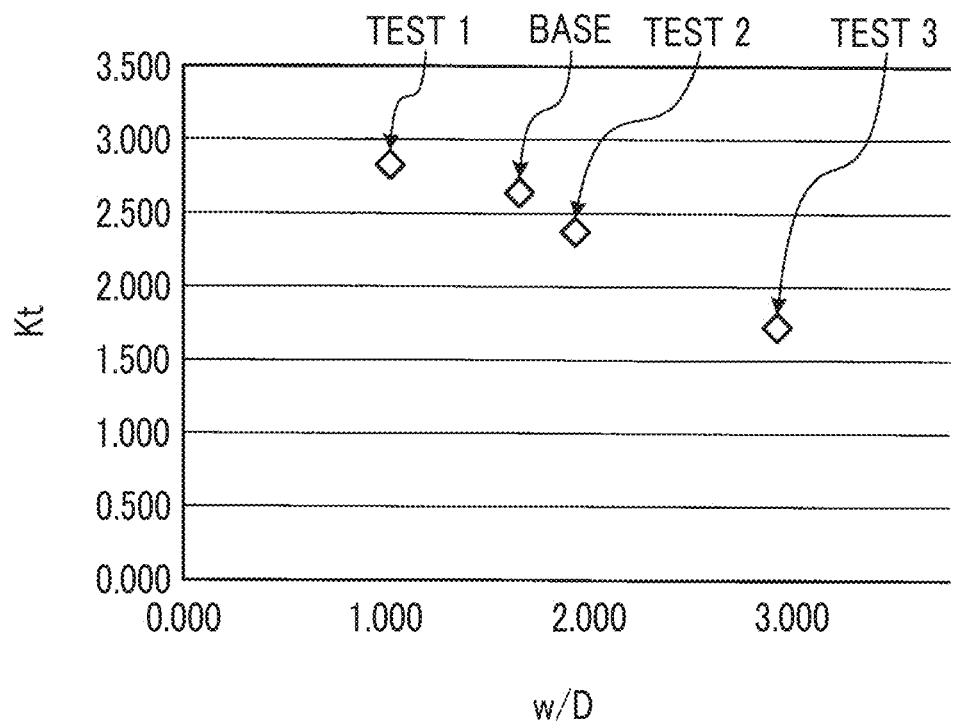
FIG. 9 is a graph according to the example of the present invention.
Figure 10:
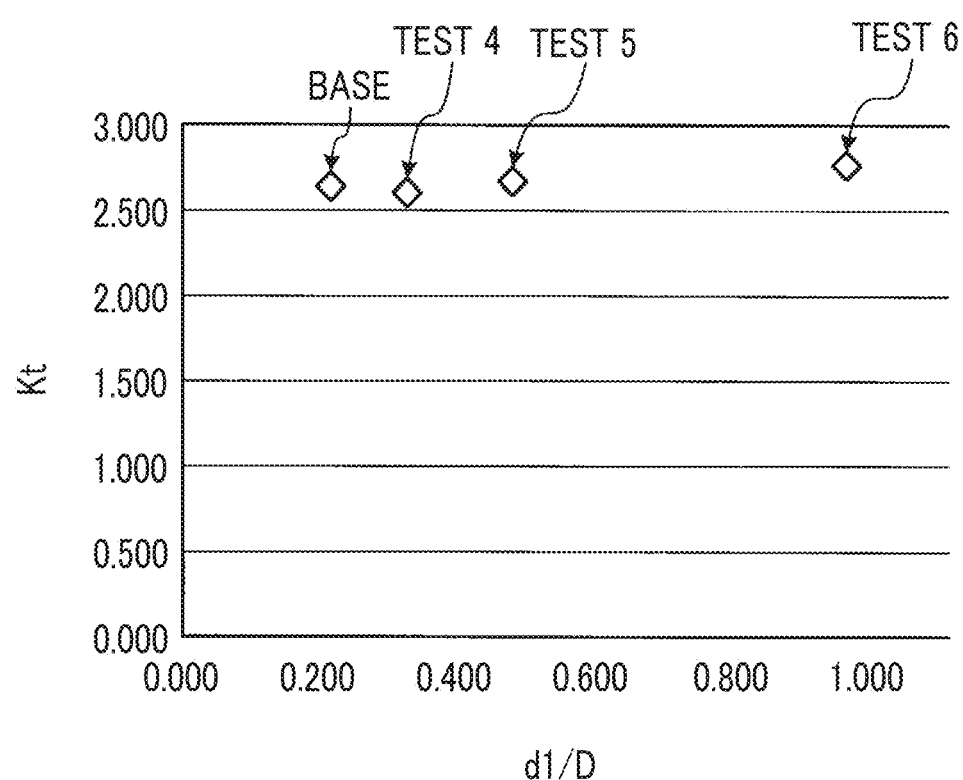
FIG. 10 is a graph according to the example of the present invention.

An example will be described below. FIG. 8 is a chart according to this example. FIGS. 9 and 10 are graphs according to this example.

In this example, three-dimensional static structural analysis was performed with regard to Base and Tests 1 to 6. As illustrated in FIG. 8, specified in Base and Tests 1 to 6 are the shortest distance d1 between the recess and the opening edge of the machined hole, the diametral dimension w of the recess in the axial direction, a dimension w1 (see FIG. 2) of the circular arc portion side of the recess in the axial direction from the center of the machined hole, a dimension w2 (see FIG. 2) of the open portion side of the recess in the axial direction from the center of the machined hole, and the deepest depth h of the recess. The machined hole has a perfect circle shape as illustrated in FIG. 2 and has the same diametral dimension D (0.26) in Base and Tests 1 to 6. The recess has the circular arc portion, the open portion, and the inclined surface as illustrated in FIGS. 2 and 3 and is disposed on both axial side portions of the machined hole. In Tests 1 to 3, the diametral dimension w of the recess in the axial direction was changed. In Tests 4 to 6, the shortest distance d1 between the recess and the opening edge of the machined hole was changed. The unit of the numerical values in FIG. 8 is inch.

Each rhombus in FIGS. 9 and 10 is an outer back node of the machined hole (the axial upper end 1a of the opening portion of the machined hole 1 in FIG. 2) and the rhombuses indicate Kt at the nodes. Kt is a stress concentration coefficient and is the ratio of an analysis result to the theoretical stress at infinity.

As illustrated in FIG. 9, in Tests 1 to 3, it can be seen that Kt decreases by nearly 20% in the case of w=2D and nearly 50% in the case of w=3D with respect to w=D. Although not clearly illustrated in FIG. 9, the axial lower end 1a of the opening portion of the machined hole 1 in FIG. 2 shows a similar tendency. Accordingly, it can be seen that a stress reduction effect can be obtained by D being increased with respect to w=D.

As illustrated in FIG. 10, in Tests 4 to 6, it can be seen that Kt decreases by nearly 10% in the case of d1=D/2 and d1=D/3 with respect to d1=D. Although not clearly illustrated in FIG. 10, the axial lower end 1a of the opening portion of the machined hole 1 in FIG. 2 shows a similar tendency. Accordingly, it can be seen that a stress reduction effect can be obtained by D being increased with respect to d1=D.

REFERENCE SIGNS LIST

1 Machined hole
1a Axial end
2 Recess
2a Circular arc portion
2b Open portion
2c Inclined surface
10 Cylindrical member
12 Gas turbine casing

The invention claimed is:

1. A stress reduction structure,
wherein a recess recessed in a depth direction of a machined hole is formed on a circumferential side-portion of the machined hole formed in a cylindrical member, and
in the recess, a part of an opening edge is formed in a circular arc shape, a bottom portion gradually decreases in depth by a flat inclined surface from a part along the circular arc shape toward an open side of the circular arc shape, an open portion where the circular arc shape is open and both ends of the circular arc shape are linearly connected, and the circular arc-shaped part is disposed toward the machined hole.

2. The stress reduction structure according to claim 1,
wherein the recess has a deepest depth within a range of 50% or less of a plate thickness of the cylindrical member in which the machined hole is formed.

3. The stress reduction structure according to claim 1,
wherein the recess has a shortest distance to an opening edge of the machined hole within a range of 50% or less of a circumferential diametral dimension of the machined hole.

4. The stress reduction structure according to claim 1,
wherein a circumferential diametral dimension of the recess is within a range of 100% or more to 300% or less of a circumferential diametral dimension of the machined hole.

5. The stress reduction structure according to claim 1,
wherein an axial diametral dimension of the recess is within a range of 100% or more to 300% or less of an axial diametral dimension of the machined hole, and the axial diametral dimension of the machined hole is included in a circumferential position in the range of the axial diametral dimension of the recess.

6. The stress reduction structure according to claim 1,
wherein the recesses are disposed on both circumferential side-portions of the machined hole.

7. The stress reduction structure according to claim 1, wherein the recesses are disposed on both circumferential side-portions of the machined hole and formed in a symmetrical shape with respect to a center of the machined hole.

8. The stress reduction structure according to claim 1, wherein the machined hole is formed in an elliptical shape that is long in a circumferential direction.

9. A gas turbine casing, comprising a cylindrical member having the machined hole and the recess according to claim 1.

10. A gas turbine comprising the gas turbine casing according to claim 9 as an outer shell.

11. A stress reduction structure,
wherein a recess recessed in a depth direction of a machined hole is formed on a circumferential side-portion of the machined hole formed in a cylindrical member, and
in the recess, a part of an opening edge is formed in a circular arc shape, a bottom portion gradually decreases in depth by an inclined surface from a part along the circular arc shape toward an open side of the circular arc shape, an open portion where the circular arc shape is open and both ends of the circular arc shape are linearly connected, and the circular arc-shaped part is disposed toward the machined hole.

12. A stress reduction structure,
wherein a recess recessed in a depth direction of a machined hole is formed on a circumferential side-portion of the machined hole formed in a cylindrical member, and
in the recess, a part of an opening edge is formed in a circular arc shape, a bottom portion is formed so as to be gradually decreased in depth by an inclined surface from a part along the circular arc shape toward an open side of the circular arc shape, and the circular arc-shaped part is disposed toward the machined hole,
wherein the recesses are disposed on both circumferential side-portions of the machined hole.

13. The stress reduction structure according to claim 12, wherein the recess has a deepest depth within a range of 50% or less of a plate thickness of the cylindrical member in which the machined hole is formed.

14. The stress reduction structure according to claim 12, wherein the recess has a shortest distance to an opening edge of the machined hole within a range of 50% or less of a circumferential diametral dimension of the machined hole.

15. The stress reduction structure according to claim 12, wherein a circumferential diametral dimension of the recess is within a range of 100% or more to 300% or less of a circumferential diametral dimension of the machined hole.

16. The stress reduction structure according to claim 12, wherein an axial diametral dimension of the recess is within a range of 100% or more to 300% or less of an axial diametral dimension of the machined hole, and the axial diametral dimension of the machined hole is included in a circumferential position in the range of the axial diametral dimension of the recess.

17. The stress reduction structure according to claim 12, wherein the recesses are formed in a symmetrical shape with respect to a center of the machined hole.

18. The stress reduction structure according to claim 12, wherein the machined hole is formed in an elliptical shape that is long in a circumferential direction.

19. A gas turbine casing, comprising a cylindrical member having the machined hole and the recess according to claim 12.

20. A gas turbine, comprising the gas turbine casing according to claim 19 as an outer shell.

* * * * *